United States Patent [19]

Kroyer

[11] 4,265,671

[45] May 5, 1981

[54] METHOD OF UTILIZING FLY ASH FROM POWER WORKS AND REFUSE DISPOSAL PLANTS IN THE PRODUCTION OF CEMENT CLINKERS, AND A PLANT FOR CARRYING OUT SAID METHOD

[76] Inventor: Karl K. K. Kroyer, Engtoften 3, DK-8260 Viby J., Denmark

[21] Appl. No.: 23,496

[22] Filed: Mar. 23, 1979

Related U.S. Application Data

[63] Continuation of Ser. No. 865,153, Dec. 28, 1977, abandoned.

[30] Foreign Application Priority Data

Jan. 4, 1977 [GB] United Kingdom ............... 47/77

[51] Int. Cl.³ ............................................. C04B 7/36
[52] U.S. Cl. ................................................... 106/103
[58] Field of Search ................. 106/100, 103, DIG. 1

[56] References Cited

U.S. PATENT DOCUMENTS

| | | | |
|---|---|---|---|
| 3,302,938 | 2/1967 | Bendy | 106/100 |
| 3,437,329 | 4/1969 | Ostberg et al. | 106/100 |

*Primary Examiner*—James Poer
*Attorney, Agent, or Firm*—Ladas & Parry

[57] ABSTRACT

A process for producing cement clinkers is disclosed whereby fly ash is added to the lower as well as to the upper end of a rotary kiln containing a firing zone and wherein the fly ash is admixed with calcareous materials in accordance with the desired composition of the product.

3 Claims, 1 Drawing Figure

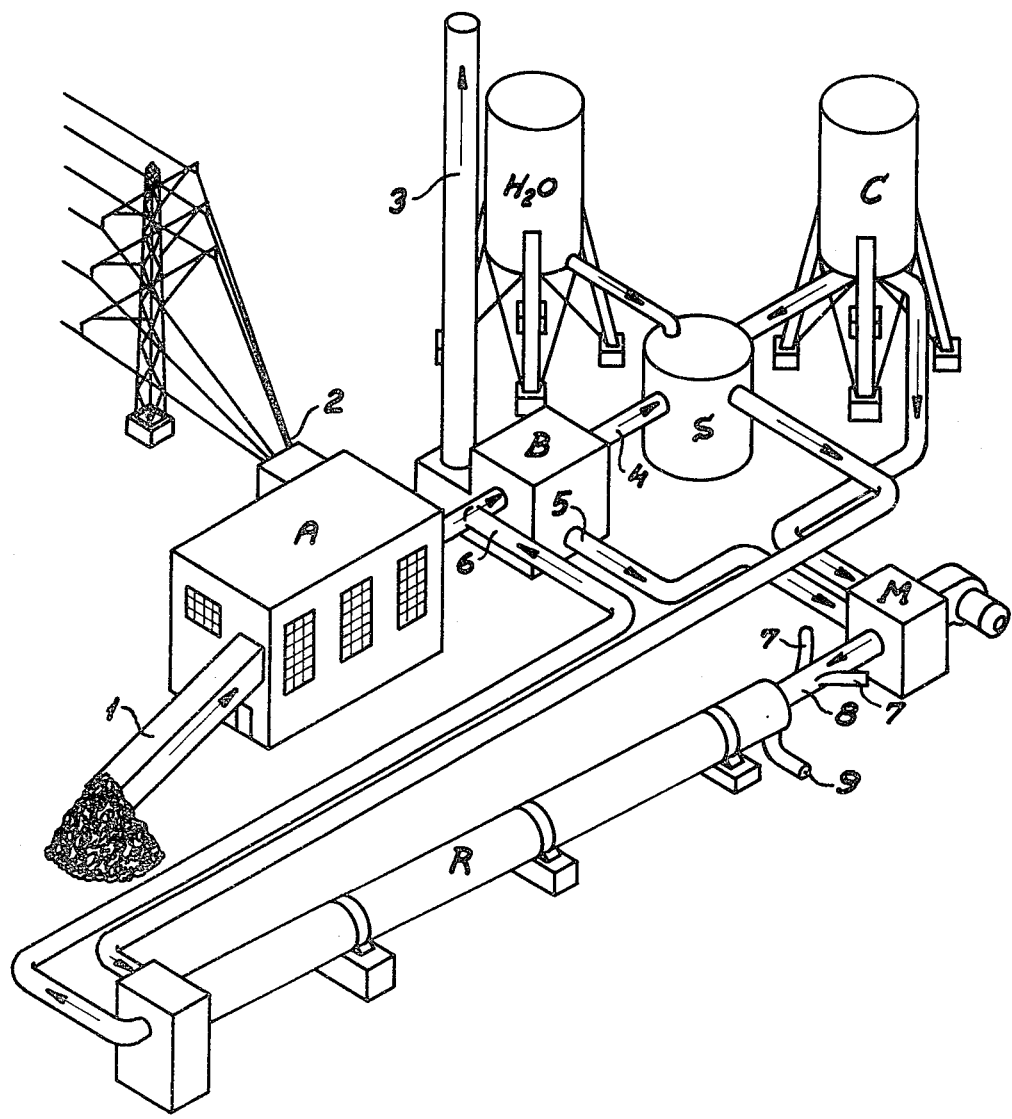

METHOD OF UTILIZING FLY ASH FROM POWER WORKS AND REFUSE DISPOSAL PLANTS IN THE PRODUCTION OF CEMENT CLINKERS, AND A PLANT FOR CARRYING OUT SAID METHOD

This is a continuation, of application Ser. No. 865,153 filed Dec. 28, 1977, now abandoned.

The present invention relates to a method of utilizing fly ash from power works and refuse disposal plants in the production of cement clinkers in a rotary kiln and a plant for carrying out said method. The invention further comprises cement materials obtained according to said method.

In the conventional production of cement clinkers the raw materials, which in the case of Portland cement are mainly lime or chalk and clay as well as possibly sand, bauxite, blast-furnace slag, iron minerals, etc., either ground to a fine powder (raw meal) in the so-called dry process or slurried in water (raw slurry) in the so-called wet process, are introduced at the upper end of a rotary kiln. Just before their introduction or in the rotary kiln itself the raw materials are converted to nodules which as they pass down through the kiln are first freed from water and then from the $CO_2$ contained in the chalk, whereupon normally without being completely melted they are sintered to form a partially glassy phase and finally discharged from the lower end of the kiln into the clinker cooler.

The clinkers are then ground with a minor amount of gypsum (usually about 2%) to obtain cement having the desired hydraulic properties.

By varying the raw materials and degree of grinding it is thus possible to obtain various types of cement, and particularly by employing a greater amount of bauxite it is possible to obtain the so-called melt cement.

As is well-known, coal-burning power works produce vast amounts of fly ash consisting of varying amounts of unburned carbon, frequently about 10 to 30%, together with various inorganic components, particularly oxides, whose composition depends on the type of fuel used.

This fly ash presents serious problems by way of pollution, because of the difficulty in separating the total amount in the conventional filter and also because the percolate from the dumps and other sites used for depositing the fly ash may contain impurities, such as heavy metals which by percolation may pollute the drinking water. Besides, it presents a problem by itself to find suitable sites for depositing of the fly ash without impairing the environment.

Dependent on the efficiency of the power works the fly ash will often contain relatively substantial amounts of carbon which results in a considerable loss of energy. Similar problems apply to refuse disposal plants, which besides fly ash also produce a great amount of slag.

A method making possible industrial utilization of this fly ash from power works and refuse disposal plants would therefore represent a great technical advance in a number of respects.

It has now been found that the fly ash may be incorporated in a method for producing cement clinkers which may have a composition for example corresponding to Portland cement or melt cement.

The claimed method further makes it possible to reduce or remove the sulphur content of exhaust gases from oil or coalburning power works and refuse disposal plants.

The invention further relates to a plant for carrying out the said method.

It has previously been suggested to use fly ash in the so-called Trief-process for the production of melt cement. This process is based on completely melting fly ash and additional raw materials such as lime, chalk or $Al_2O_3$ in combination kilns where semi-melting may be effected in a rotary kiln with subsequent complete melting in a vat furnace. The liquid product is shock cooled by pouring into cold water to form an amorphous glassy granulate which is then ground into a so-called binder of minute particle size and latent hydraulic properties. The hydraulic effect is produced in an aqueous medium in the presence of a catalyst such as NaOH.

In the first place, it is generally assumed to be disadvantageous, to use additional alkalies in the production of cement. The said two-step process furthermore is cumbersome and energy-consuming and does not permit complete utilization of the carbon content of the fly ash, the heating in the first phase taking place while the material is in powder form and the energy is thus substantially given off to the exhaust gases without being utilized in the process. Owing to danger of explosion when introducing directly into the melt raw materials containing such large amounts of carbon as normally contained in fly ash a vat furnace could not operate on an industrial scale. In addition the carbon present will burn off on the surface of the furnace contents without giving off any appreciable quantity of heat thereto, which means that the greater part must be burnt off in the rotary kiln before transfer to the vat furnace.

The method according to the invention is characterized by introducing to the lower end of a rotary kiln co-currently with the injected air fly ash whose mineral composition at least by adding calcareous minerals has been adjusted in accordance with the desired composition of the clinkers, while introducing to the upper end of the kiln in counter-current with the air a mixture of calcareous, siliceous, ferriferous and argillaceous raw materials adapted to the desired composition of the clinkers, of which the siliceous, ferriferous and argillaceous raw materials wholly or partially may be constituted by fly ash.

The introduction of fly ash from the lower end entails, as is explained in greater detail below, a utilization of the residual carbon of the ashes at the combustion and thereby an improved firing economy, but solves at the same time an important problem that may arise when fly ash rich in carbon is introduced solely from the upper end of the kiln, viz. the formation of carbon monoxide (CO).

At the combustion of the oil or coal used as fuel in the lower end of the kiln carbon dioxide ($CO_2$) is formed, while part of the oxygen of the fed air is consumed. Likewise, the heating of the lime introduced as raw materials brings about a calcination under liberation of $CO_2$. If fly ash rich in carbon is present in the raw materials fed in the upper end, a reaction may under suitable temperature conditions take place between the fly ash coal and $CO_2$ under formation of the highly toxic carbon monoxide (CO).

This CO will only have an insignificant possibility of oxidizing to $CO_2$ during the passage through the upper, colder end of the kiln and the subsequent filter system, and will therefore be given off to the ambient.

Finally, suitable mix proportions between CO and air or oxygen will result in explosive mixtures which may be ignited by a spark generated by an accident.

The introduction of the fly ash rich in carbon from the lower end gives a high measure of certainty of a complete combustion of this carbon and thereby a reduced risk of formation of CO.

If nevertheless it is desired to introduce the fly ash from the upper end, a fly ash poor in carbon may advantageously be used, or a fly ash which, as is explained below, is recycled from the filters when it has passed the kiln and given off its coal.

The amount of raw materials fed to the lower end may preferably constitute a substantial proportion, for example about 30% to 50% of the total amount of raw materials. In the production of cement clinkers according to the invention one will as a rule introduce a mixture of raw materials of generally identical mineral composition at both ends to prevent problems of incompability in the zone where the materials meet.

Unlike the Trief process, the method according to the invention is conveniently carried out in a rotary kiln of the type usually used for the production of cement or for producing blistered, possibly crystallized glass materials as described in British Pat. No. 992,782, for example. The method is extremely flexible since by varying the amount of raw materials, the points of introducing same and the kiln temperature it is possible to adjust the kiln to obtain different clinker materials, such as Portland cement or melt cement, as desired.

The fundamental aspect of the method according to the invention is, as stated, the use of fly ash enriched with lime, especially as chalk, in a combined co-current and counter-current raw material introduction.

The composition of the fly ash, including its content of $SiO_2$, $Al_2O_3$ and $CaO$ will vary according to the coal used in the combustion and in the case of refuse disposal plants according to the composition of the refuse. In the method according to the invention one will adjust the mineral contents dependent on the desired end product, but in practice always add $CaCO_3$, generally as chalk, and in such amounts that the end product has a $CaO$ content of about 60%.

Beyond that, it may be necessary to adjust the $Al_2O_3$ content which in the case of Portland cement should be from 3 to 8, typically from 4% to 7%. The adjustment is advantageously performed by adding clay or bauxite. Generally speaking, the proportion of the components of the finished cement product, naturally, should be such as complies with the limits specified in the triangular diagram, and also the various cement modules shall be observed.

One may use co-ground fly ash and chalk or fly ash ground together with such minerals that the mixture will have a composition corresponding to Portland cement, but it has been found possible in the method according to the invention when applied to fly ash to avoid this co-grinding when producing cement clinkers according to the wet process as the fly ash may be added directly to the slurry of chalk and any other raw materials. The fly ash is very often so fine that grinding is unnecessary. Thus, the fly ash may be blown direct into the lower part of the kiln. Naturally, this is a great advantage in terms of process procedure, which at the same time results in a considerable saving of energy.

A typical mixture of raw materials for the production of cement clinkers having a $CaO$ content of about 60% is 30% of fly ash, possibly in the form of 15% of two different types of fly ash, together with 70% of chalk. Depending upon the mineral composition of the fly ash and the type of the desired clinker material 25–35% of fly ash and 75–65% of chalk may be used, however.

The kiln is advantageously heated by injecting oil which may be mixed with a portion or the total amount of fly ash having a composition adjusted according to the end product and which is to be introduced at the lower end of the kiln. The use of oil is advantageous because the latter's higher flash point and with that the temperature of the firing zone affords an added guarantee of the residual carbon of the fly ash being utilized in the combustion. In practice the primary air is used for the injection. The mineral-adjusted fly ash may alternatively be injected through one or more separate tubes proximate the fire tubes of the kiln.

The method according to the invention further involves a considerable technical advance as regards the firing with coal often used in the production of cement clinkers. In this case it is normally a serious disadvantage that the ashes deriving from the combustion of coal, which frequently amount to 20% to 40% of the total quantity of coal, settle on the surface of the adhesive clinker particles, thereby impairing their quality since the ashes do not have the proper composition as regards formation of clinkers.

This disadvantage attached to coal firing may be overcome according to the invention, whereby when charging the amount of chalk used for adjusting the mineral content of the fly ash to be injected at the lower end of the kiln there is added a further amount of chalk to compensate for the ashes formed during the combustion of the coal. This also makes it possible to utilize less valuable types of coal such as lignite so long as care is taken in the charging of chalk to obtain a composition suitable for cement clinkers.

A part of the introduced material will not be caught by the clinker material after having liberated its caloric content but will pass to the upper end of the kiln where a portion will be absorbed on the still wet surface of the raw material on its way to form clinkers while the rest will get caught by one or more filters, possibly bag filters or electro filters. This latter generally dusty material may advantageously be recirculated to the upper end of the kiln.

The method according to the invention is particularly useful for the production of cement materials in direct connection with a power works or refuse disposal plant. In the first place, one has direct access to the fly ash, and the utilisation of the residual carbon of the fly ash in the rotary kiln means that it is not necessary to operate the power works or refuse disposal plant with view to complete combustion of the coal.

In practice it is expensive and difficult to reduce the carbon content of fly ash to below 10%, and it is therefore possible to obtain a considerable saving in initial, repair and operating expenses of the works if a content of, for example, from 20% to 25% of unburned carbon in the exhaust gas and fly ash could be permitted. The essential part of this unburned carbon can be utilized in the method according to the invention, which offers a great advantage over the other alternative of increasing the heating surfaces of the power works or refuse disposal plants.

Finally, by a modification of the method according to the invention one solves another important problem, i.e. removal of the sulphur content of the exhaust gases. Whether the power works or refuse disposal plants are oil or coalburning substantial amounts of sulphur are given off to the ambient, and therefore in recent years the authorities have imposed heavy restrictions on suitable fuels and made heavy demands on purification of the exhaust gases respectively. Unlike oil, this is complicated by the absence of known methods of pretreating coal in order to reduce the sulphur content.

As stated, the filters in the method according to the invention will collect some filter chamber dust being generally chalk and dust from the fly ash or slag. When passing through such filters sulphurous exhaust gases will give off a substantial portion of their content of sulphur to the chalk and convert same to calcium sulfate.

The experience from blistered glass production plant using 35 metric tons of heavy fuel oil per day has shown that it is possible to absorb about 80% of the sulphur content in the exhaust gases, and there is no reason to assume that the condition should change in a cement clinker production of the type set forth here.

This fact makes possible a particularly interesting modification of the method according to the invention when carried out in connection with power works or refuse disposal plants. By conducting the chalky dust from the rotary kiln to the hot gas filters, such as bag filters or electro filters, of the power works or refuse disposal plant it actually becomes possible to save the filters associated with the rotary kiln but also to bond the sulphur of the exhaust gases as calcium sulphate in the filter dust which in the filters is mixed with the fly ash, while the gases with a substantially reduced sulphur content may be discharged to the ambient.

Furthermore, if desired, it is possible to charge before the filters an additional amount of chalk, for instance about 25% for adjustment of the mineral content, with the effect that one may draw directly from the filters a raw material of the desired composition for the production of cement, and wherein the sulphur is safely bonded. However, in the production of cement, owing to the greater amount of chalk required, one will as a rule, only add as much chalk, for instance the said 25%, before the filters as necessary for reducing the sulphur content and then, if necessary, add additional chalk during the slurrying step in case of employing the wet process.

It is thus possible by suitable charging with chalk to obtain direct from power works and refuse disposal plants a fly ash which possibly after additional charging with chalk is suitable for the production of clinkers, and where the sulphur content is bonded in a form where it will not be liberated to the ambient.

A plant for carrying out the method according to the invention is therefore profitably characterized by comprising a combustion kiln from an oil and/or coal-burning power works or refuse disposal plant as well as one or more rotary kilns and the necessary feeding, recycling and discharging means as well as other auxiliary equipment such as crushing means, mixing means, etc., and one or more common filters such as bag filters, electrofilters or cyclones for the exhaust gases from the rotary kiln and the hot gases from the combustion kiln.

The cement prepared according to the invention can be utilized in the usual manner, but a particularly interesting material is concrete obtained from a cement prepared according to the invention where the aggregate used is a blistered crystallized glass material. After crushing with a great part of the blisters cleaved, the latter material shows an extremely high degree of surface roughness whereby the individual particles mesh with a kind of gear-wheel effect which imparts to such cement-bonded concrete very high tensile strength.

The fact that in the production of the above products one may use two raw materials, whose mineral composition, apart from the CaO content, may be identical, likewise results in excellent compatibility between the components, which makes it possible to avoid harmful reactions that could adversely affect the properties of the products.

The invention will be further illustrated with reference to the drawing, in which FIG. 1 is a flow sheet applying to the production of cement clinkers according to one embodiment in connection with a coal-burning power works, after completion of the initial starting up procedures.

In FIG. 1 numeral A designates a power works stoked with coal at 1 and delivering power at 2. From there the hot gases containing the fly ash are transferred to the filter B to which also exhaust gases 6 containing dust essentially consisting of fly ash and chalk are conducted from the rotary kiln R.

The gases, which in the reaction with the chalk dust have been freed from the greater part of their sulphur content, leave the filter at 3, while a portion of the filter material, now consequently containing the sulphur in bonded form, at 4 is transferred to the slurry tank S which is charged with water and possibly with additional chalk from the container C. The slurry is conducted to the upper end of the rotary kiln R and passes through same as explained above. At 5 another portion of the filter material containing fly ash and chalk and bonded sulphur having substantially the same mix proportion as the components fed to the upper end is removed, and it is recycled at 8 to the lower end of the kiln. In order to obtain the proper mix proportion, meaning in practice a sufficiently high content of chalk, additional chalk may, if necessary, be charged to the mixer M from the container C. The kiln is fired with coal or preferably oil at 7.

The cement clinkers formed are removed at 9 and ground with gypsum, e.g. in a ball mill, to obtain a cement of the desired hydraulic properties.

EXAMPLE

A rotary kiln was used with a length of 70 m and a diameter which was 2 m over the first approximately three-quarter length and about 2.8 m over the remaining length. The kiln inclination was about 2° and the kiln made one revolution for every 65 seconds.

Iron chains are hanging from the walls over the first 10–15 meters of the kiln to produce good heat transfer to the raw materials introduced and afford a larger surface contributory to retention of dust, especially when the wet process is applied.

(A) A mixture of raw materials in slurry form was prepared from the following raw materials:

(1) 70 parts by weight of lime from Hillerslev in North Jutland.

(2) 15 parts by weight of fly ash from the Power Works at Aarhus (Studstrup).

Studstrup stated this fly ash to be composed as follows:

|  | % by weight |
|---|---|
| $SiO_2$ | 55,9 |
| $Al_2O_3$ | 4,16 |

-continued

|  | % by weight |
|---|---|
| $Fe_2O_3$ | 10,6 |
| CaO | 19,1 |
| $SO_3$ | 1,17 |
| $P_2O_5$ | 0,23 |
| MgO | 3,31 |
| $TiO_2$ | 0,18 |
| $Na_2O$ | 0,17 |
| $K_2O$ | 0,36 |
| $Li_2O$ | 96 ppm |
| Ignition loss | 17,93 |

(3) 40 parts by weight of fly ash from the power works "Nordkraft Elektricitetsvaerk" at Aalborg, which stated the following composition:

| Ignition loss | 33,6 |
|---|---|
| $SiO_2$ | 32,3 |
| $Al_2O_3$ | 16,3 |
| $Fe_2O_3$ | 8,4 |
| CaO | 2,2 |
| MgO | 0,4 |
| Alkali | 3,1 |
| $SO_3$ | 2,8 |
| Various | 0,9 |

These three compounds were slurried with water to a pumpable slurry and introduced to the upper end of the kiln. (about 75% solids).

The product formed nodules quickly after entering the rotary kiln, and these nodules passed down through the kiln without melting.

The nodules became somewhat integrated such that some small nodules would be incorporated in the surface of larger nodules, but the end product showed nodules on the order of from 2 to 3 mm and up to a diameter of 20 mm.

The finished clinkers were ground with 4% gypsum for 6 hours in a pilot plant ball-mill with porcelain globes, which resulted in a product having an average particle size of about 20 μm.

An analysis made by the Norwegian Portland cement producer NORCEM showed the following composition (given in percent by weight):

|  |  | 18 hours later | 27 hours later |
|---|---|---|---|
| $Fe_2O_3$ | 4,57 | 3,60 | 3,73 |
| MgO | 2,22 | 2,00 | 1,94 |
| CaO | 56,90 | 57,98 | 64,02 |
| $SiO_2$ | 25,64 | 25,62 | 22,09 |
| $K_2O$ | 0,89 | 0,71 | 0,28 |
| $SO_3$ | 0,76 | 0,73 | 0,56 |
| $Al_2O_3$ | 8,77 | 7,15 | 6,68 |
| $Na_2O$ | 0,45 | 0,41 | 0,25 |
| Free CaO | 1,95 | 2,90 | 1,70 |

Thus the product had properties similar to Portland cement, and it will be seen that after 27 hours the process had stabilized on a satisfactorily low content of alkali.

(B) The test was repeated, about 30% of the raw materials being introduced to the lower end of the kiln. Clinkers of similar quality were obtained.

If desired, rather than introducing slurry to the kiln, one may treat the raw materials to obtain a pasty mass which is nodulated before introduction.

It was evident that the production of cement according to the invention involved a considerably lower caloric consumption than necessary when using ordinary raw materials. The energy saving may thus be as high as 20 to 35%.

In the first place, this could be demonstrated by the fact that no residual carbon was found in the clinkers, and secondly, because the oil consumption was very low when introducing the carbon-containing raw materials at the lower end of the kiln.

However, an accurate assessment of the caloric consumption was not possible in these tests, in the first place because the test was conducted in continuation of tests with blistered glass in rapid succession in the course of three to four days, and secondly because the lining of the rotary kiln was very thin in the firing zone when the experiments were started so that the outer temperature in some places were so high that it was necessary to spray water onto the outside of the kiln over a 10 m zone to prevent damage to the kiln by the excessive temperature. Thus optimal conditions were not obtained.

In conclusion the great importance of the invention should be stressed with a view to environmental and social aspects.

It should thus be mentioned that the Danish power works alone are currently producing more than 200,000 tons of fly ash per year, and before the end of 1980 probably 350,000 tons of fly ash. This makes possible a cement production according to the method of the invention of 350,000 tons and more than 800,000 tons respectively.

Thus, it is possible to obviate the environmental problems explained above, relating to the depositing of so big amounts of fly ash, and at the same time to obtain considerable savings in raw materials over the production of a corresponding amount of cement from the ordinary raw materials.

What I claim is:

1. In a method for producing cement clinkers in a rotary kiln fed from both ends with calcareous, siliceous, ferriferous and argillaceous raw materials with a composition adapted as necessary for clinker formation, said kiln being stoked with fuel injected from the lower end together with a gas supporting the combustion, and where the clinkers produced after nodulization and subsequent sintering are removed from the lower end of the kiln and cooled, while the added gases and those produced during the process are removed from the upper end of the kiln and are freed of entrained dust in a filter, the improvement which comprises introducing exclusively to a firing zone in the lower end of the rotary kiln co-currently with the injected combustion-supporting gas fly ash, said fly ash and calcareous minerals added therewith being in an amount such as to constitute 30 to 50% by weight of the total raw materials, said fly ash having a mineral composition which together with the total of the calcareous minerals corresponds with the desired composition of the clinkers.

2. A method according to claim 1, wherein the rotary kiln is stoked with coal, and in addition to the amount of lime necessary for adjusting the mineral composition of the fly ash injected at the lower end of the kiln a further amount is added to compensate for the ashes formed during the combustion process.

3. A method according to claim 1, wherein the cement production is performed in direct connection with a power works or a refuse disposal plant, which is provided with hot gas filters for example for collecting fly ash formed, and wherein the exhaust gases of the rotary kiln containing entrained lime dust or entrained lime dust and fly ash are directed to said hot gas filters, and that filter dust collected therein is directed back to the rotary kiln process when it has taken up the sulphur compounds and fly ash of the hot gases.

* * * * *